(12) United States Patent
Yang

(10) Patent No.: US 11,560,830 B2
(45) Date of Patent: Jan. 24, 2023

(54) SUPERCHARGING DEVICE FOR ENGINE OF VEHICLE

(71) Applicants: Hyundai Motor Company, Seoul (KR); Kia Corporation, Seoul (KR)

(72) Inventor: Il Suk Yang, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/495,267

(22) Filed: Oct. 6, 2021

(65) Prior Publication Data
US 2022/0333565 A1    Oct. 20, 2022

(30) Foreign Application Priority Data

Apr. 19, 2021    (KR) .......................... 10-2021-0050587

(51) Int. Cl.
*F02B 37/16*    (2006.01)

(52) U.S. Cl.
CPC .................................. *F02B 37/16* (2013.01)

(58) Field of Classification Search
CPC .............. F02B 37/16; F02M 35/10157; F02M 35/10091
See application file for complete search history.

(56) References Cited

U.S. PATENT DOCUMENTS 6,052,995 A * 4/2000 Krimmer ................ F02B 37/16
60/611

FOREIGN PATENT DOCUMENTS

JP           4592563 B2   12/2010
KR    10-2017-0116327 A   10/2017

* cited by examiner

*Primary Examiner* — Audrey B. Walter
*Assistant Examiner* — Edward Bushard
(74) *Attorney, Agent, or Firm* — Fox Rothschild LLP

(57) ABSTRACT

A supercharging device is configured to increase an amount of intake air of an engine of a vehicle, where the supercharging device includes a chamber formed to be open in an ejecting direction of a compressor outside an ejecting portion of a compressor housing of the compressor, and an air adding device configured to supply air not compressed by the compressor to the chamber.

7 Claims, 7 Drawing Sheets

SUPERCHARGING DEVICE FOR ENGINE OF VEHICLE

CROSS REFERENCE TO RELATED APPLICATION

The present application claims under 35 U.S.C. § 119(a) the benefit of Korean Patent Application No. 10-2021-0050587, filed Apr. 19, 2021, the entire contents of which are incorporated by reference herein.

BACKGROUND

(a) Technical Field

The present disclosure relates to a supercharging device for increasing an amount of intake air of an engine.

(b) Description of the Related Art

A supercharging device may be classified into a turbocharger pressurizing air to be supplied to an engine with a compressor by driving a turbine with energy of exhaust gas of the engine, and a supercharger pressurizing air by driving a compressor with rotational power drawn from an engine or with a separate power source such as a motor independent of exhaust gas of the engine.

In the supercharging device as described above, notwithstanding differences caused by characteristics of a driving power source, supercharging performance is mainly determined by performance of the compressor, which is determined by structural characteristics such as a diameter of a compressor wheel, a trim, a scroll type of a compressor housing, etc., and since such structural characteristics mainly depend on a size of the compressor, the size of the compressor tends to determine the limit of supercharging performance of the supercharging device.

Therefore, considering mounting in a vehicle and a weight of the supercharging device, the size of the compressor is limited, and the supercharging performance is similarly limited, and thus, it may be difficult to provide sufficient supercharging performance required by the engine.

The matters described as the background technology of the present disclosure are only for better understanding of the background of the present disclosure, and should not be taken as acknowledging that they correspond to the related art already known to those of ordinary skills in the art.

SUMMARY

The present disclosure provides a supercharging device that has a simple configuration and with a size of a compressor that is equivalent to an existing compressor of a vehicle, but is capable of further increasing a supercharging flow rate without an additional energy source and expanding an operating range of the compressor to allow effective improvement of engine output.

In order to achieve the objects described above, the supercharging device for increasing an amount of intake air of an engine of a vehicle according to the present disclosure includes a chamber formed to be open in an ejecting direction of a compressor outside an ejecting portion of a compressor housing of the compressor; and an air adding device configured to supply air not pressurized by the compressor to the chamber.

The chamber may be made of a space formed in a ring shape outside the ejecting portion of the compressor housing, and a hose insertion portion into which a connecting hose delivering air ejected from the compressor toward the engine is inserted may be provided outside the chamber.

An inlet port may be provided to supply air in communication with the chamber upstream of the hose insertion portion, and a center line of the inlet port may be formed at an acute angle to a center line of the ejecting portion of the compressor housing in order that flow resistance of the air supplied to the chamber is reduced and that the air easily merges with the air ejected from the compressor.

The portion where the inlet port meets the chamber may be provided with a widening slope formed such that the cross-sectional area of airflow increases from the inlet port toward the chamber.

The chamber may be provided with a distribution protrusion protruding toward the inlet port in a wedge shape so that the air flowing in from the inlet port is dispersed to merge with the air ejected from the compressor.

The ejecting end of the compressor housing may be formed in a slope sloping from the chamber toward the center of the ejecting end so that the air flowing in through the chamber smoothly merges with the air ejected from the compressor.

The air adding device may be configured to draw air from the intake duct installed to supply air to be compressed to the compressor and supply the air to the chamber, bypassing the compressor.

The chamber may be provided with an inlet port to receive air, and the air adding device may include a supplying hose connected from the intake duct to the inlet port.

The present disclosure allows an effective improvement of an engine output by enabling a further increase of a supercharging flow rate without an additional energy source and an expansion of an operating range of a compressor even with a simple configuration and a size of a compressor on an equivalent level.

DETAILED DESCRIPTION OF THE DISCLOSURE

Figure 1:
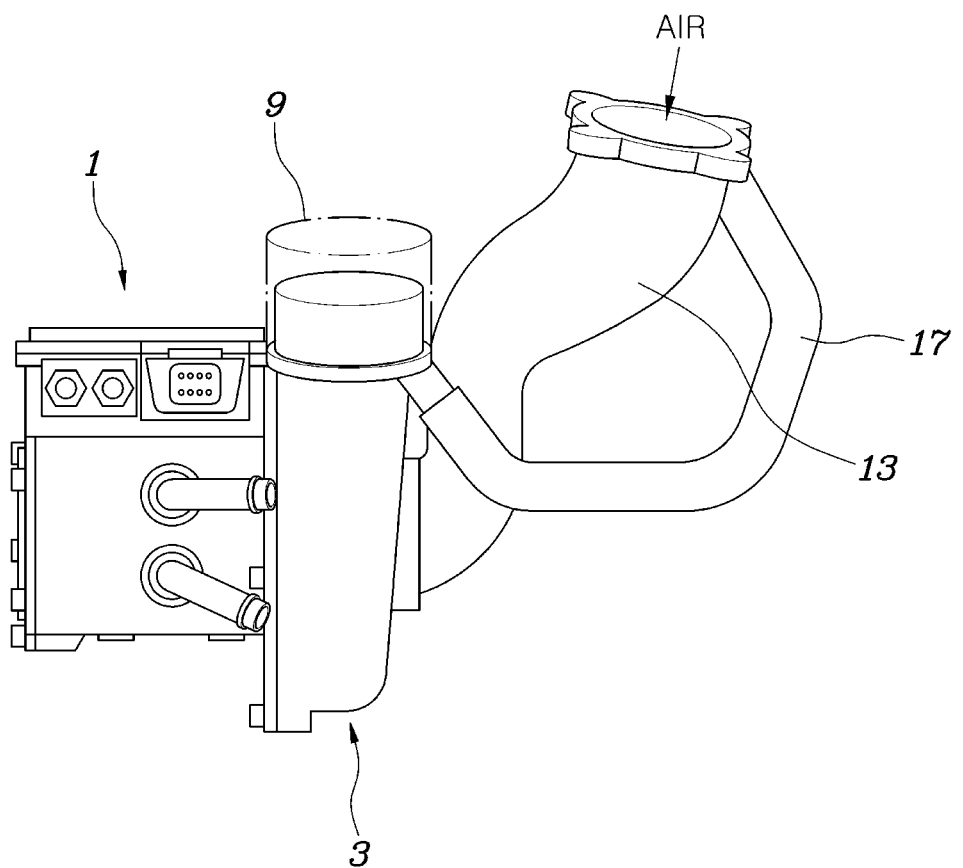
FIG. 1 is a view showing an embodiment of a supercharging device according to the present disclosure.
Figure 2:
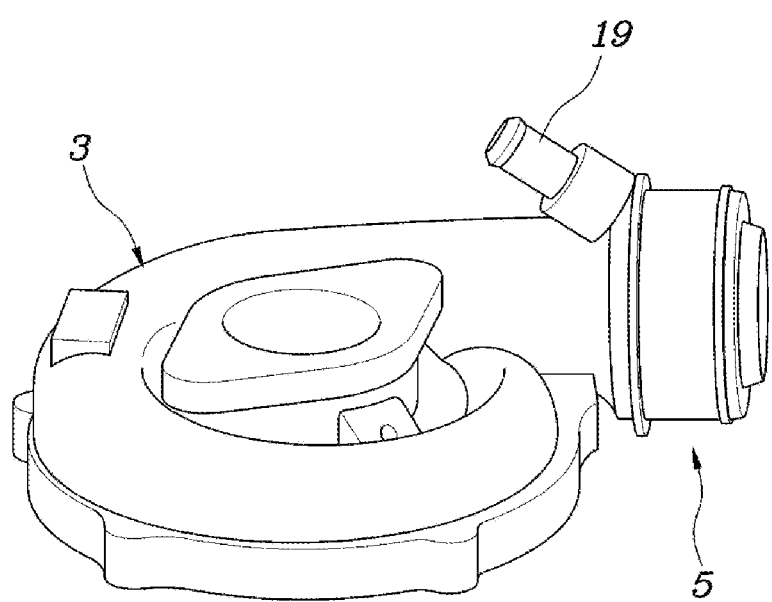
FIG. 2 is a view showing a compressor housing of the supercharging device in FIG. 1.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural or functional descriptions of the embodiments of the present disclosure disclosed in the present specification or application are presented by way of examples only for the purpose of describing the embodiments according to the present disclosure, and the embodiments according to the present disclosure may be implemented in various forms and should not be construed as being limited to the embodiments described in the present specification or application.

Since the embodiments according to the present disclosure may be modified in various ways and have various forms, specific embodiments will be illustrated in the drawings and described in detail in the present specification or application. However, this is not intended to limit the embodiments according to the concept of the present disclosure to a specific disclosure form and should be construed as including all modifications, equivalents, and substitutes included in the spirit and technical scope of the present disclosure.

Terms such as first and/or second may be used to describe various components, but the components should not be limited by the terms. The terms only serve the purpose of distinguishing one component from other components. For example, the first component may be referred to as the second component, and similarly, the second component may also be referred to as the first component without deviating from the scope of the right according to the concept of the present disclosure.

When a component is referred to as being "connected" or "coupled" to another component, it may be directly connected or coupled to the another component, but it should be understood that other components may exist in between. On the other hand, when a component is referred to as being "directly connected" or "directly coupled" to another component, it should be understood that there is no other component in between. Other expressions describing the relationship between components such as "between" and "just between" or "adjacent to" and "directly adjacent to" should be interpreted in the same manner.

The terms used in the present specification are only used to describe specific embodiments and are not intended to limit the present disclosure. Singular expressions include plural expressions unless the context explicitly indicates otherwise.

Unless otherwise defined, all terms used herein, including technical or scientific terms, have the same meanings as are generally understood by those with common knowledge in the art to which the present disclosure belongs. The terms such as those defined in a generally used dictionary should be interpreted as having meanings consistent with the meanings in the context of the related technology and should not be interpreted as an idealistic or excessively formal meaning unless explicitly defined in the present specification.

Hereinafter, the present disclosure will be described in detail by describing preferred embodiments of the present disclosure with reference to the accompanying drawings. The same reference numerals shown in each drawing indicate the same members.

Referring to FIGS. 1 to 5, an embodiment of a supercharging device according to the present disclosure includes a chamber 7 formed to be open in an ejecting direction of a compressor 3 outside an ejecting portion 5 of the compressor 3, forming a supercharging device 1; and an air adding device configured to supply air not compressed by the compressor 3 to the chamber 7.

That is, the present disclosure allows the air not compressed by the compressor 3 to be added, by the air adding device and the chamber 7, to the air compressed by the compressor 3 and ejected through the ejecting portion 5 to increase a supercharging flow rate supplied to an engine.

According to the present embodiment, the chamber 7 is made of a space formed in a ring shape outside the ejecting portion 5 of the compressor 3 housing and a hose insertion portion 11 into which a connecting hose 9 delivering the air ejected from the compressor 3 toward the engine is inserted is provided outside the chamber 7.

That is, the connecting hose 9 connecting to an intake manifold of the engine or an intercooler is inserted into the hose insertion portion 11 to deliver the air ejected from the compressor 3 toward the engine, while the air supplied through the air adding device is additionally supplied toward the engine by way of the connecting hose 9 through the chamber 7 provided inside the hose insertion portion 11.

According to the present embodiment, the air adding device is configured to draw air from an intake duct 13 installed to supply the air to be compressed by the compressor 3 and supply the air to the chamber 7, bypassing the compressor 3.

That is, an inlet port 15 is provided upstream of the hose insertion portion 11 to be able to supply air in communication with the chamber 7; and the air adding device is configured to include a supplying hose 17 connected from the intake duct 13 to the inlet port 15 so that a part of the air of the intake duct 13, apart from the air supplied to the compressor 3, is directly supplied to the inlet port 15 and the chamber 7 through the supplying hose 17 to be supplied toward the engine, bypassing the compressor 3.

The supplying hose 17, which is the main component of the air adding device, may be installed to connect the intake duct 13 with the inlet port 15, but may also be installed to connect any position in an engine intake path with the inlet port 15 in order that the air from which foreign substances are filtered out by an air cleaner is eventually supplied to the inlet port 15 in a state where an intake resistance is low.

A nipple 19 preferably is installed in the inlet port 15 to facilitate the connection of the inlet port 15 and the supplying hose 17.

Figure 3:
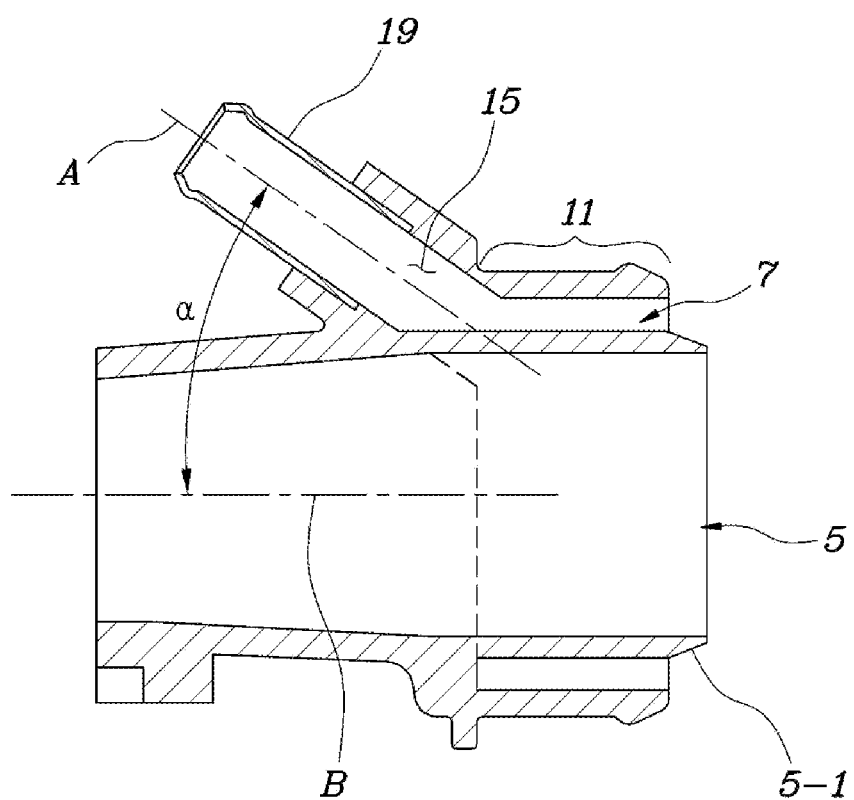
FIG. 3 is a longitudinal view showing an ejecting portion of the compressor housing in FIG. 2.

According to the present embodiment, as shown in FIG. 3, the inlet port 15 is configured such that a center line A of the inlet port 15 is at an acute angle α to a center line B of the ejecting portion 5 of the compressor 3 housing in order that flow resistance of the air supplied to the chamber 7 may be reduced and that the air may easily merge with the air ejected from the compressor 3.

Practically, the angle α between the center line A of the inlet port 15 and the center line B of the ejecting portion 5 of the compressor 3 housing is preferably set to 15° to 60°.

Figure 4:
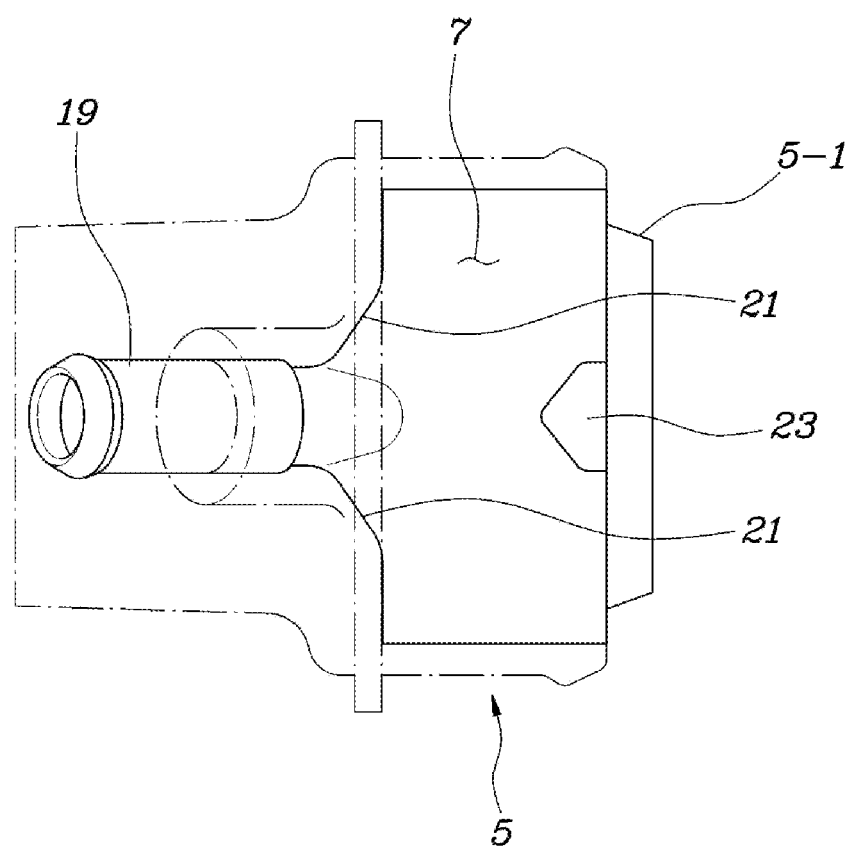
FIGS. 4 and 5 are views illustrating a structure in which air is supplied to a chamber through an inlet port.

In addition, as shown in FIG. 4, the portion where the inlet port 15 meets the chamber 7 is provided with a widening slope 21 formed such that a cross-sectional area of airflow increases from the inlet port 15 toward the chamber 7.

Of course, the portion where the widening slope 21 is connected to the inlet port 15 and the portion where the widening slope 21 is connected to the chamber 7 are preferably formed with curved surfaces having appropriate curvatures so that the flow resistance of air may be reduced as low as possible.

Figure 5:
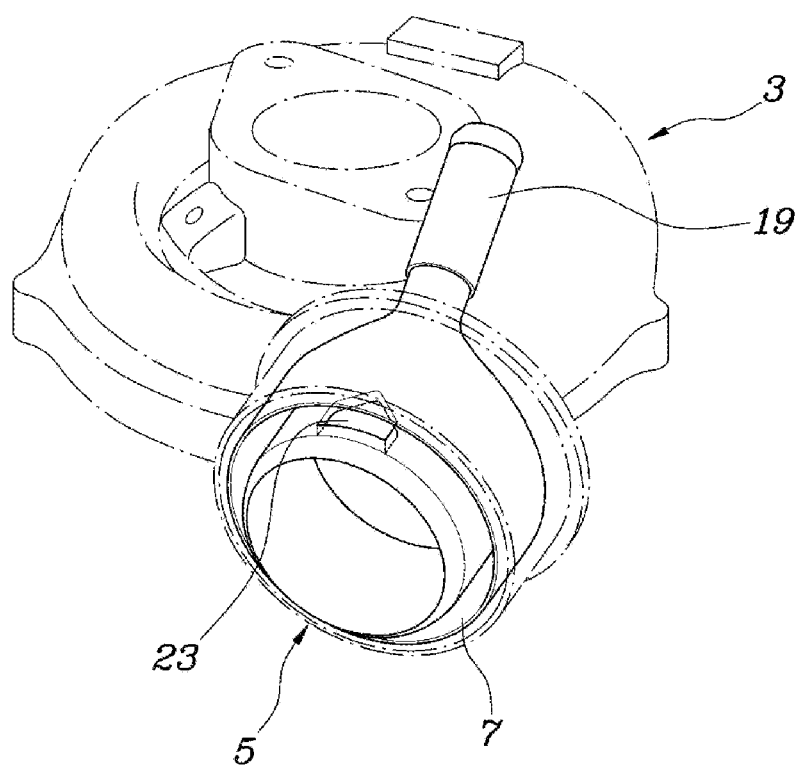

In addition, as shown in FIGS. 4 and 5, the chamber 7 is provided with a distribution protrusion 23 protruding toward the inlet port 15 in a wedge shape so that the air flowing in from the inlet port 15 is diffused to merge with the air ejected from the compressor 3.

In addition, as shown in FIG. 3, an ejecting end 5-1 of the compressor 3 housing formed in a slope sloping from the chamber 7 toward the center of the ejecting end 5-1 so that the air flowing in through the chamber 7 smoothly merges with the air ejected from the compressor 3.

By the configuration as described above, the air supplied to the inlet port 15 through the supplying hose 17 is basically led to meet the air ejected from the compressor 3 at an acute angle, and in a state of being evenly distributed over an entire circumferential surface the chamber 7 forms due to the widening slope 21 and the distribution protrusion 23, smoothly merges with the air ejected from the compressor 3 due to the inclined surface of the ejecting end 5-1 to be supplied toward the engine through the connecting hose 9.

Figure 6:
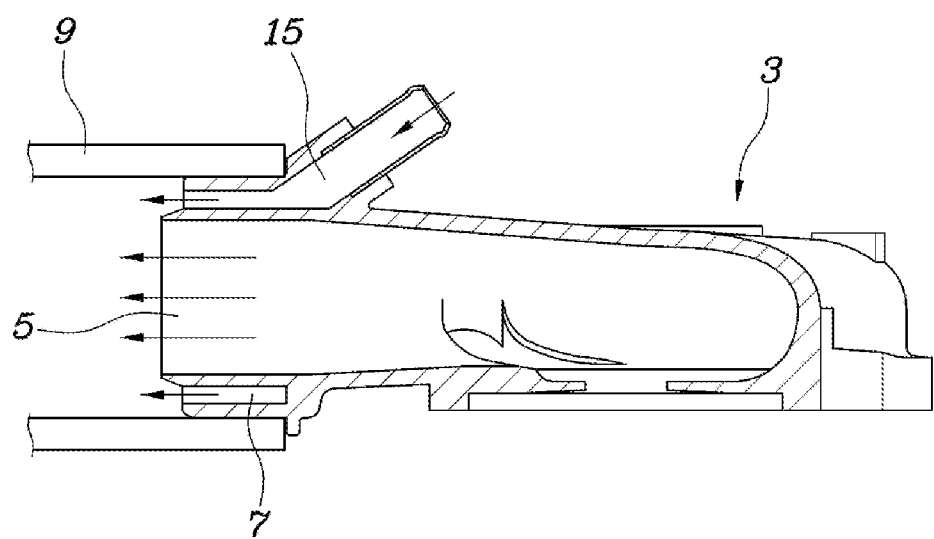
FIG. 6 is a view illustrating a principle by which a supercharging flow rate increases through an inlet port and a chamber.

FIG. 6 describes the principle of increased supercharging flow rate according to the present disclosure as described above. When the air compressed by the compressor 3 is ejected to the ejecting portion 5, the air passes through the ejecting portion 5 at a high flow rate. At this time, the high velocity of the air causes pressure to drop in the vicinity of the ejecting portion 5, generating a difference between the pressure in the vicinity of the ejecting portion 5 and pressure in the chamber 7, and by the Coanda Effect by which the air of the chamber 7 flows to the ejecting end 5-1 of the housing, the air in the chamber 7 merges with the air ejected from the compressor 3.

Therefore, the effect of increased supercharging flow rate according to the present disclosure is achieved without an additional separate energy source, and the increased supercharging flow rate further contributes to higher engine output.

Figure 7:
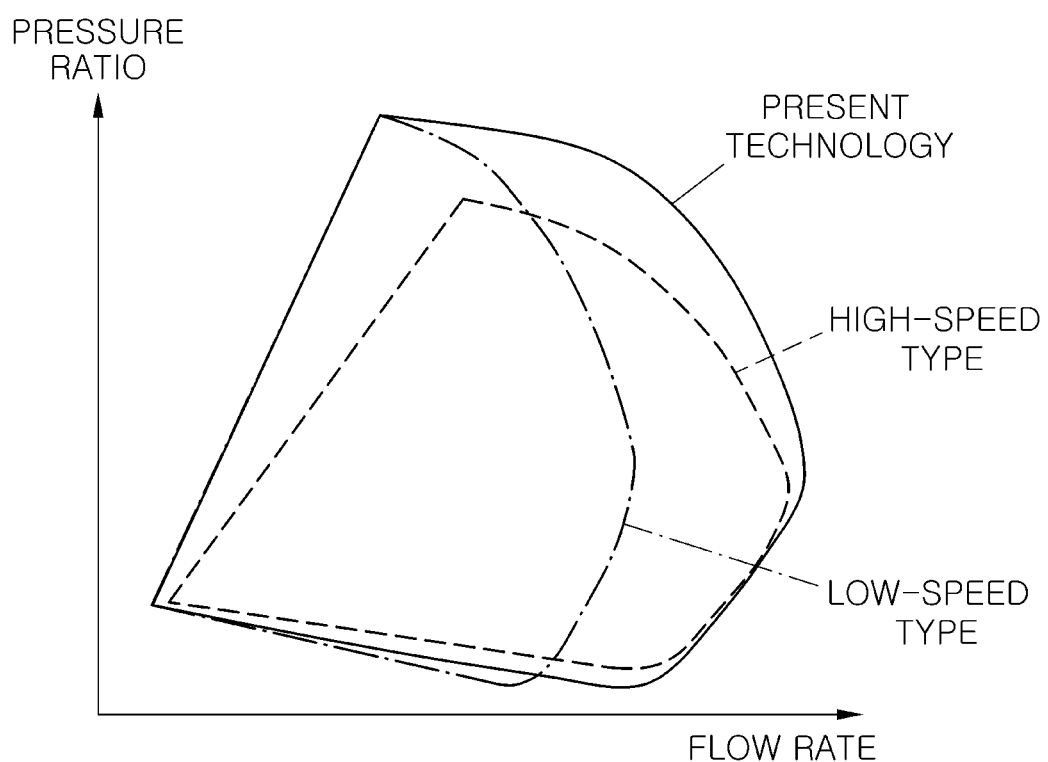
FIG. 7 is a view illustrating an effect of the present disclosure in a graph.

Note that the operating range of the general low-speed compressor 3 and the operating range of the high-speed compressor 3 are different from each other as shown in FIG. 7, which is a graph illustrating the effect of the present disclosure. By applying the present disclosure, a wider operating range including the operating range of the high-speed compressor 3 as well as the operating range of the low-speed compressor 3 may be secured through the additional increase of the supercharging flow rate, and the power performance of the engine may be further improved.

For example, according to the present disclosure, if a flow rate needed for a high-speed operation of an engine is additionally secured by the air adding device and the chamber 7 as described above while acceleration performance of a vehicle is secured by adopting a compressor 3 relatively small enough to sufficiently secure a low-speed operation performance of an engine, high-speed performance of the engine is sufficiently supported, further improved output performance over the entire range from the low-speed operating range to the high-speed operating range of a vehicle may be secured, and thus, the merchantability of the vehicle is enhanced.

Specific embodiments of the present disclosure are illustrated and described, but it will be self-evident to those with common knowledge in the related art that the present disclosure may be improved and modified in various ways within the scope not departing from the technical spirit of the present disclosure provided by the patent claims below

What is claimed is:

1. A supercharging device for increasing an amount of intake air of an engine of a vehicle, the supercharging device comprising:
    a chamber formed to be open in an ejecting direction of a compressor outside an ejecting portion of a compressor housing of the compressor; and
    an air adding device configured to supply air not compressed by the compressor to the chamber;
    wherein the chamber is made of a space formed in a ring shape outside the ejecting portion of the compressor housing, and
    a hose insertion portion into which a connecting hose delivering air ejected from the compressor toward the engine is inserted is provided outside the chamber.

2. The supercharging device according to claim 1, wherein an inlet port is provided upstream of the hose insertion portion to supply air in connection with the chamber, and
    a center line of the inlet port is formed at an acute angle to a center line of the ejecting portion of the compressor housing so that flow resistance of the air supplied to the chamber is reduced and that the air may easily merge with the air ejected from the compressor.

3. The supercharging device according to claim 2, wherein a portion where the inlet port meets the chamber is provided with a widening slope formed such that a cross-sectional area of airflow increases from the inlet port toward the chamber.

4. The supercharging device according to claim 2, wherein the chamber is provided with a distribution protrusion protruding toward the inlet port in a wedge shape so that air flowing in from the inlet port is dispersed to merge with the air ejected from the compressor.

5. The supercharging device according to claim 1, wherein the air adding device is configured to draw air from an intake duct installed to supply air to be compressed to the compressor and supply the air to the chamber, bypassing the compressor.

6. The supercharging device according to claim 5, wherein the chamber is provided with an inlet port to receive air and the air adding device is configured to include a supplying hose connected from the intake duct to the inlet port.

7. A supercharging device for increasing an amount of intake air of an engine of a vehicle, the supercharging device comprising:
- a chamber formed to be open in an ejection direction of a compressor outside an ejecting portion of a compressor housing of the compressor; and
- an air adding device configured to supply air not compressed by the compressor to the chamber;
- wherein an ejecting end of the compressor housing is formed in a slope sloping from the chamber toward a center of the ejecting end so that air flowing in through the chamber smoothly merges with air ejected from the compressor.

\* \* \* \* \*